(12) United States Patent
Capper et al.

(10) Patent No.: US 11,044,197 B2
(45) Date of Patent: Jun. 22, 2021

(54) SYSTEM AND METHOD FOR PROTECTING RESOURCES USING NETWORK DEVICES

(71) Applicant: Arista Networks, Inc., Santa Clara, CA (US)

(72) Inventors: Simon Francis Capper, San Jose, CA (US); Kenneth James Duda, Santa Clara, CA (US); Hugh Holbrook, Palo Alto, CA (US)

(73) Assignee: Arista Networks, Inc., Santa Clara, CA (US)

( * ) Notice: Subject to any disclaimer, the term of this patent is extended or adjusted under 35 U.S.C. 154(b) by 42 days.

(21) Appl. No.: 16/511,898

(22) Filed: Jul. 15, 2019

(65) Prior Publication Data

US 2021/0021515 A1    Jan. 21, 2021

(51) Int. Cl.
*H04L 12/721* (2013.01)
*H04L 12/46* (2006.01)

(52) U.S. Cl.
CPC .......... *H04L 45/70* (2013.01); *H04L 12/4633* (2013.01)

(58) Field of Classification Search
CPC ............................ H04L 45/70; H04L 12/4633
See application file for complete search history.

(56) References Cited

U.S. PATENT DOCUMENTS

| | | | | |
|---|---|---|---|---|
| 6,829,709 B1 * | 12/2004 | Acharya | ............... | H04L 63/164 370/338 |
| 6,983,325 B1 * | 1/2006 | Watson | ................... | H04L 45/24 709/228 |
| 8,199,651 B1 * | 6/2012 | Schrempp | ........... | H04L 47/2483 370/235 |
| 10,374,953 B1 * | 8/2019 | Branch | ................. | H04L 45/745 |
| 10,635,428 B2 * | 4/2020 | Nidumolu | ........... | G06F 11/1464 |
| 2003/0079121 A1 * | 4/2003 | Gilman | ............... | H04L 63/0428 713/153 |
| 2004/0125797 A1 * | 7/2004 | Raisanen | ................ | H04L 45/38 370/389 |
| 2006/0002304 A1 * | 1/2006 | Ashwood-Smith | ..... | H04L 45/00 370/238 |
| 2006/0203804 A1 * | 9/2006 | Whitmore | ............... | H04L 45/00 370/352 |
| 2007/0153741 A1 * | 7/2007 | Blanchette | ............. | H04L 45/66 370/331 |
| 2011/0069632 A1 * | 3/2011 | Chen | ..................... | H04L 43/026 370/253 |
| 2015/0180764 A1 * | 6/2015 | Pacella | ................. | H04L 45/306 709/242 |
| 2017/0063940 A1 * | 3/2017 | Lapidous | ............ | H04L 12/4641 |
| 2017/0289197 A1 * | 10/2017 | Mandyam | ............... | H04L 63/06 |

(Continued)

*Primary Examiner* — Ivan O Latorre
(74) *Attorney, Agent, or Firm* — Chamberlain, Hrdlicka, White, Williams & Aughtry

(57) ABSTRACT

In general, embodiments of the invention relate to processing network traffic data units (NTDUs). More specifically, embodiments of the invention relate to processing NTDUs transmitted between client device and the one or more protected resources. The protected resources are logically surrounded by a perimeter, which is implemented as a set of network devices that manage the flow of NTDUs between client devices and the protected resources. The perimeter works in conjunction with a set of filtering devices to determine whether a given NTDU can ultimately be transmitted to, and processed by, a protected resource.

22 Claims, 5 Drawing Sheets

(56) References Cited

U.S. PATENT DOCUMENTS

| | | | |
|---|---|---|---|
| 2017/0359310 A1* | 12/2017 | Jameson | H04L 45/02 |
| 2019/0230008 A1* | 7/2019 | Labonte | H04L 43/04 |
| 2020/0106719 A1* | 4/2020 | Acharya | H04L 12/4633 |
| 2020/0137115 A1* | 4/2020 | Janakiraman | H04L 12/4633 |
| 2020/0252239 A1* | 8/2020 | Lee | H04L 45/02 |
| 2020/0348517 A1* | 11/2020 | Mayrand | G06F 3/011 |

* cited by examiner

US 11,044,197 B2

SYSTEM AND METHOD FOR PROTECTING RESOURCES USING NETWORK DEVICES

BACKGROUND

Scenarios exist in which servers in a data center network can be overwhelmed by a distributed denial of service (DDOS) attack that is orchestrated by one or more of the client devices connecting to the data center network. The DDOS attacks generally take the form of hundreds, or thousands, of "fake client devices" sending network traffic to the servers. These "fake client devices" can aggregate an amount of traffic that is large enough to overwhelm the servers' processing or network capacity. If the servers become overwhelmed, the overall operation of the servers is negatively impacted.

SUMMARY

In general, in one aspect, the invention relates to a method for processing network traffic data units (NTDUs), the method comprising: receiving, by a first network device, a first NTDU from a second network device, wherein the first NTDU originated from a client device, making a first determination that the first NTDU is a client-to-resource NTDU, based on the first determination, making a second determination that the first NTDU is associated with a validated flow, and based on the second determination, transmitting the first NTDU to a resource.

In general, in one aspect, the invention relates to a non-transitory computer readable medium comprising instructions that, when executed by a processor, perform a method comprising: receiving, by a first network device, a first network traffic data unit (NTDU) from a second network device, making a first determination that the first NTDU is a client-to-resource NTDU, based on the first determination, making a second determination that first NTDU is associated with a validated flow, and based on the second determination, transmitting the first NTDU to a resource.

In general, in one aspect, the invention relates to network device comprising instructions that, when executed by a processor, perform a method comprising: receiving, by the network device, a network traffic data unit (NTDU) from a second network device, make a first determination that the NTDU is a client-to-resource NTDU, based on the first determination, make a second determination that NTDU is associated with a validated flow; and based on the second determination, transmitting the NTDU to a resource.

Other aspects of the invention will be apparent from the following description and the appended claims.

DETAILED DESCRIPTION

Figure 1:
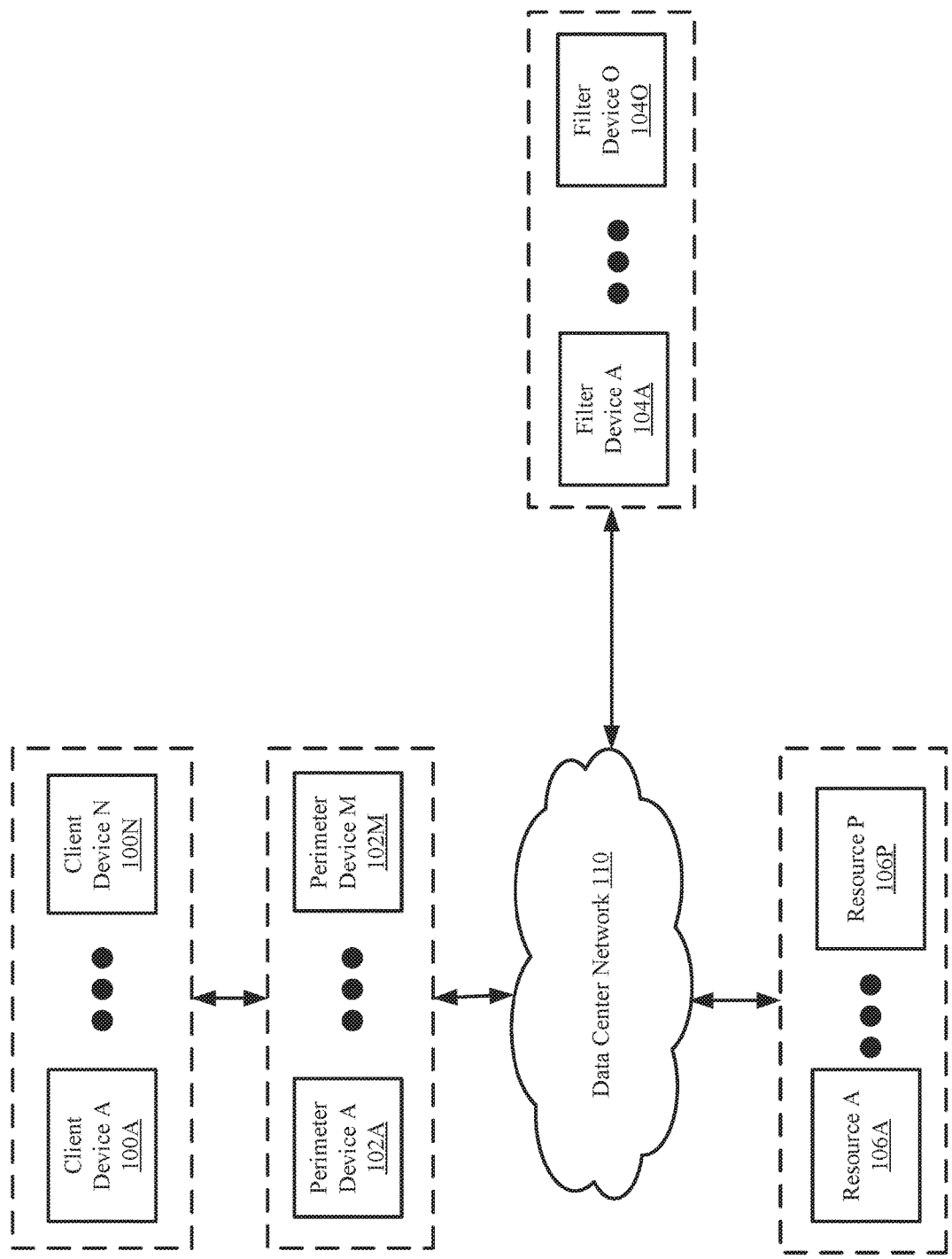
FIG. 1 shows a system in accordance with one or more embodiments.

Specific embodiments of the invention will now be described in detail with reference to the accompanying figures. Like elements in the various figures are denoted by like reference numerals for consistency.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to a method, non-transitory computer readable medium, and system for processing network traffic data units (NTDUs). More specifically, embodiments of the invention relate to processing NTDUs transmitted between client device and the one or more protected resources in a data center network. The protected resources (also referred to as resources) are logically surrounded by a perimeter, which is implemented as a set of network devices that manage the flow of NTDUs between client devices and the protected resources. The network devices that make up the perimeter are logically positioned such that all NTDUs originating from the client devices must pass through the perimeter. The perimeter works in conjunction with a set of filtering devices to determine whether a given NTDU can ultimately be transmitted to, and processed by, a protected resource. In one or more embodiments, the perimeter and the set of filtering devices may be scaled in order to meet an increased client device demand in a manner that does not impact the processing time of NTDUs. Said another way, embodiments of the invention permit the client device load to increase without negatively impacting an individual client device's experience (e.g., latency) when interacting with the protected resources.

FIG. 1 shows an exemplary system in accordance with one or more embodiments of the invention. The system includes one or more client devices (100A, 100N), one or more perimeter devices (102A, 102M), one or more filter devices (104A, 104O), and one or more resources (106A, 106P). The aforementioned components may communicate with each other using any known or later discovered communication protocol. Further, the aforementioned components may communicate using any combination of wired and/or wireless connections and wired and/or wireless networks. For example, the perimeter devices, filter devices, and resources may communicate via a data center network (110). In one embodiment of the invention, the data center network includes any combination of hardware and software components that enable the NTDUs to be communicated between the perimeter devices, filter devices, and the resources.

In one or more embodiments of the invention, a NTDU is any relevant data that is transmitted in a format dictated by any one or more network protocols or standards. Examples of such protocols or standards include, but are not limited to, Internet Protocol (IP), Media Access Control (MAC), Transmission Control Protocol (TCP), User Datagram Protocol (UDP), Infiniband, Hypertext Transfer Protocol (HTTP), etc. In one or more embodiments of the invention, the relevant data is at least a portion of the payload of a NTDU of any format.

In one embodiment of the invention, a client device (100A, 100N) is a computing device. In one or more embodiments of the invention, a computing device is any device, or any set of devices, capable of electronically processing instructions and that includes, at least, one or more processors, memory, input and output device(s), and operative network connectivity to one or more network devices. Examples of computing devices include, but are not limited to, a server (e.g., a blade-server in a blade-server chassis, a rack server in a rack, etc.), a virtual machine (VM), a desktop computer, a mobile device (e.g., laptop computer, smart phone, personal digital assistant, tablet computer and/or any other mobile computing device), a network device (e.g., switch, router, multilayer switch, etc.) and/or any other type of computing device with the aforementioned requirements.

In one or more embodiments of the invention, the client device includes functionality to send NTDUs towards one or more resources (106A, 106P) and to receive NTDUs originating from one or more resources (106A, 106P).

In one or more embodiments of the invention, the one or more perimeter devices (102A, 102M) and the one or more filter devices (104A, 104O) may be implemented using one or more network devices. In one or more embodiments of the invention, a network device may be a physical device that includes, but is not limited to, all or any subset of the following: persistent storage (not shown), memory (e.g., random access memory (RAM)) (not shown), one or more processor(s) (not shown), one or more network chips, one or more circuit components (e.g., wire, resistors, capacitors, transistors, inductors, integrated circuitry packages, printed circuit boards, diodes, comparators, etc.), one or more field programmable gate arrays (FPGAs), one or more application specific integrated circuits (ASICs), one or more complex programmable logic devices (CPLDs) and/or one, two or more physical or virtual network interfaces (which may also be referred to as ports). A network device may be connected to other devices via wired (e.g., using the ports) and/or wireless connections via one or more antennas.

In one or more embodiments of the invention, a network device includes functionality to receive NTDUs at any of the physical network interfaces (i.e., ports) of the network device, and to subsequently transmit NTDUs from any of the physical network interfaces of the network device.

Examples of network devices include, but are not limited to, a layer 2 network switch, a router, a multilayer switch, a fiber channel device, an InfiniBand® device, etc. Network devices may include functionality to inspect all or certain portions of a NTDU in order to determine whether to: (i) drop the NTDU; (ii) process the NTDU; and/or (iii) transmit the NTDU, based on the processing by network device, where the processing may be performed by a hardware component in the network device, software executing on the network device, or any combination thereof.

In one or more embodiments of the invention, a network device includes functionality to store (e.g., in persistent storage, in memory, in a register, etc.), any number of data structures (e.g., filtering information, buffering information, routing information base (RIB), queued and timestamped NTDUs, etc., forwarding information base (FIB), link state database, counters, etc.) for facilitating operation of at least some aspects of the network device.

Such structures may be stored in a data repository (not shown) included in and/or operatively connected to a network device. In one or more embodiments of the invention, a data repository is any type of storage unit(s) and/or device(s) (e.g., a file system, database, collection of tables, or any other storage mechanism) for storing data. Further, the data repository may include multiple different storage units and/or devices. The multiple different storage units and/or devices may or may not be of the same type or located at the same physical site. In one or more embodiments of the invention, the network device data repository includes all or any portion of the persistent and/or non-persistent storage of the network device as described above.

In one or more embodiments of the invention, each perimeter device (102A, 102M) is logically positioned to protect the one or more resources. The perimeter device is logically positioned to ensure that any NTDU transmitted between a client device and a resource (in either direction) is processed by one of the perimeter devices. The perimeter device includes functionality to process the NTDUs in accordance with FIG. 2.

In one or more embodiments of the invention, each filter device is logically positioned to receive NTDUs from the perimeter device. However, the filter device is generally not in the normal path of the NTDUs being transmitted between the client devices and the resources. Accordingly, the NTDUs that are ultimately transmitted from the perimeter devices to the filtering devices are transmitted via one or more tunnels (described below). The filter device includes functionality to process the received NTDUs in accordance with FIG. 3. Based on the processing of the NTDUs, one or more NTDUs may be transmitted from the filter device to the resources. Additional detail about the operation of the filter device is provided below with respect to FIG. 3.

In one or more embodiments of the invention, a resource (106A, 106P) corresponds to a computing device (as described above) The resource includes functionality to receive NTDUs from the filter devices, process the received NTDUs to generate a corresponding response (i.e., another NTDU) and then transmit the generated NTDUs towards a client device. As discussed above, the client devices are unable to directly send NTDUs to the resources; instead, NTDUs originating from the client devices that are destined to a resource are processed by at least one perimeter device and at least one filter device. Further, NTDUs originating from a resource and destined for a client device are processed by at least one perimeter device.

The processing of the NTDUs destined for the resource focuses on limiting (or eliminating) the number of malicious NTDUs that are processed by the resources. The processing of the NTDUs originating from the resource focuses on "learning" which client devices are valid (i.e., not malicious) by processing known valid NTDUs. Additional detail about the aforementioned processing is described in FIGS. 2-3.

The invention is not limited to the architecture of the system shown in FIG. 1.

Figure 2:
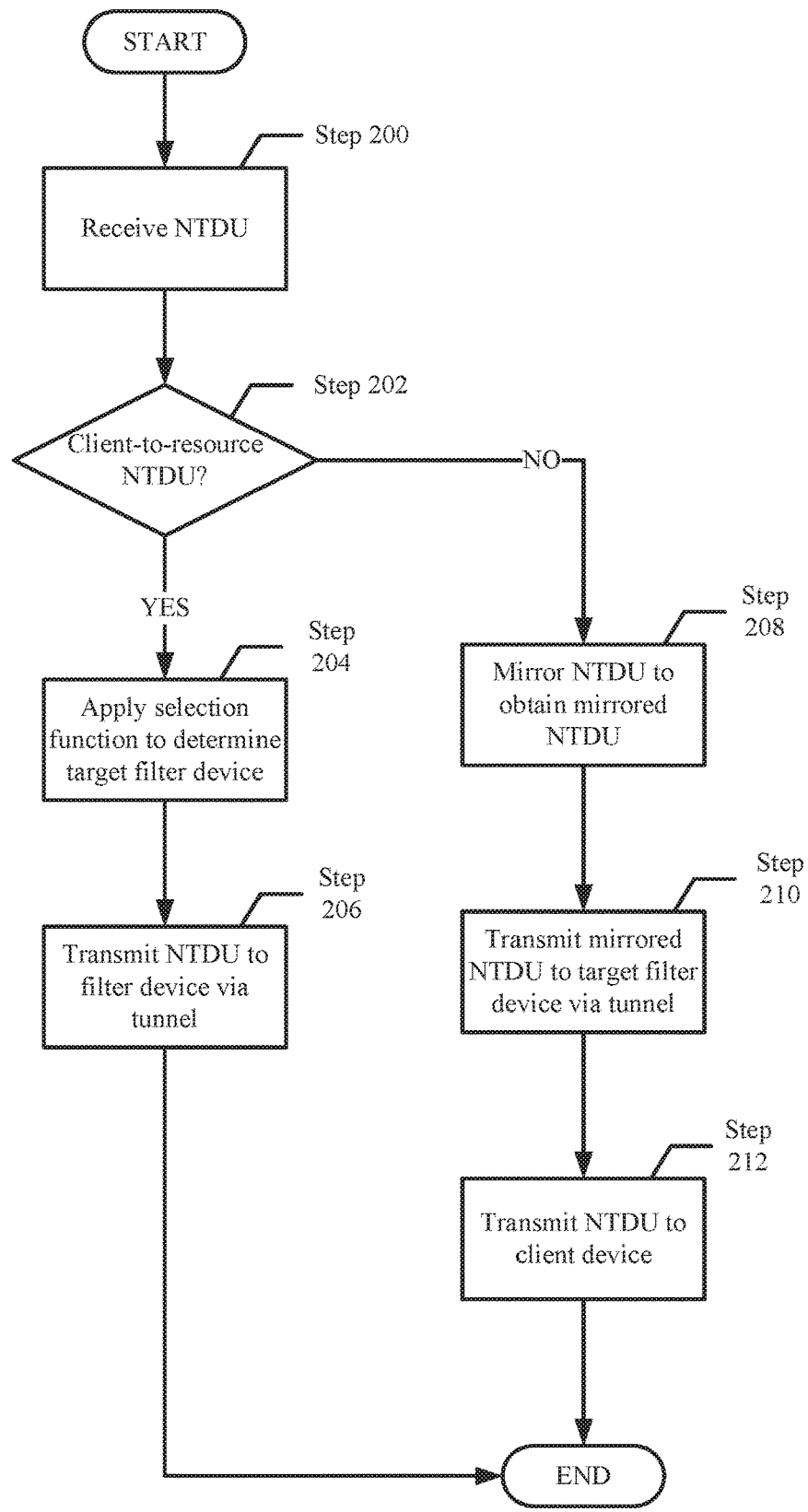
FIG. 2 shows a flowchart for processing NTDUs by a perimeter device in accordance with one or more embodiments.
Figure 3:
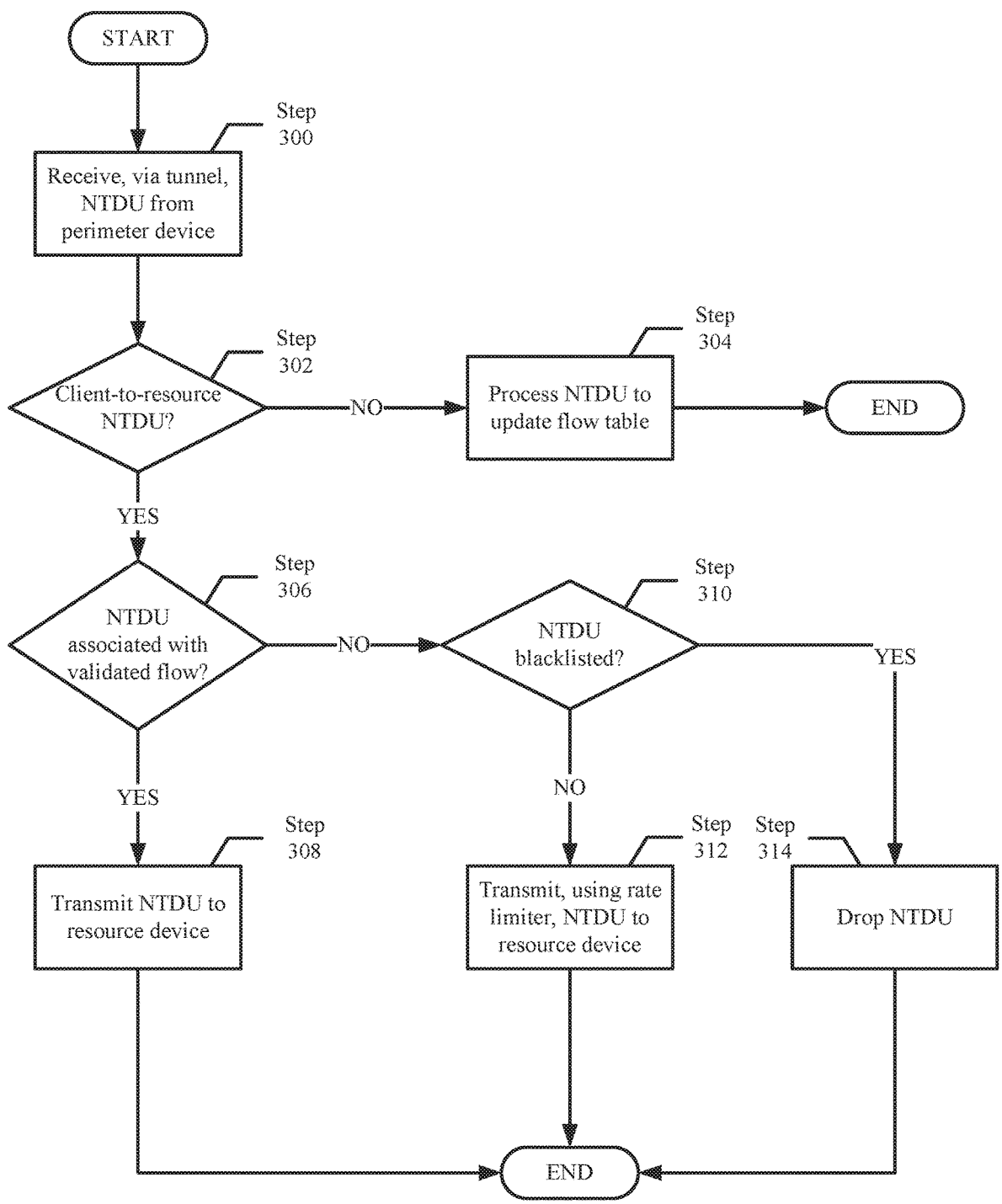
FIG. 3 shows a flowchart for processing NTDUs by a filter network device in accordance with one or more embodiments.

FIGS. 2-3 show flowcharts in accordance with one or more embodiments of the invention. While the various steps in the flowcharts are presented and described sequentially, one of ordinary skill will appreciate that some or all of the steps may be executed in different orders, may be combined or omitted, and some or all steps may be executed in parallel. In one embodiment of the invention, the steps shown in FIGS. 2-3 may be performed in parallel with any other steps shown in FIGS. 2-3 without departing from the invention.

FIG. 2 shows a flowchart for processing NTDUs by a perimeter device in accordance with one or more embodiments. As discussed above, a perimeter device may receive NTDUs originating from client devices and resources. The flowchart in FIG. 2 addresses processing of NTDUs from both client devices and resources.

Turning to FIG. 2, in step 200, a NTDU is received at a perimeter device.

In step 202, a determination is made about whether the NTDU is a client-to-resource NTDU. A NTDU is determined to be a client-to-resource NTDU when the NTDU originates from a client device and is destined for a resource (e.g., FIG. 1, 106A, 106P). In one embodiment of the invention, the determination is step 202 may be performed by analyzing at least a portion of a header in the NTDU to determine a source and destination of the NTDU. If the NTDU is a client-to-resource NTDU, the then process proceeds to step 204; otherwise, the process proceeds to step 208.

When the NTDU is a client-to-resource NTDU, then in step 204, a filter device to which to transmit the NTDU is determined (or otherwise identified). The identified filter device may be referred to as a target filter device. In one embodiment of the invention, a selection function, in combination with at least a portion of the header of the NTDU (e.g., IP addresses, port identifiers, any other component in the header, or any combination thereof), is used make the aforementioned determined. One non-limiting example of a selection function is a symmetric hash function. The selection function may be implemented on each of the perimeter devices such that regardless of which perimeter device receives the NTDUs, all NTDUs originating from the same client device are sent to the same filter device. Further, the selection function may also be (or may alternatively be) implemented such that regardless of which perimeter device receives the NTDUs, all NTDUs destined to the same resource are sent to the same filter device. In this manner, all NTDUs associated with a client device (either as the source or destination) are processed by the same filter device.

In one embodiment of the invention, the selection function may also be implemented in a manner that load balances the client devices (or, more specifically, client devices' NTDUs) across the available filter devices. Said another way, the selection function is implemented such that: (i) NTDUs originating from a given client device or destined to a given client device are processed by the same filter device and (ii) the NTDU processing load across the filtering devices is attempted to be balanced.

In one or more embodiments of the invention, balancing the load across the filter devices takes into account which filter devices are available. A filter device may be available if it can receive and process NTDUs. However, there may be instances in which there is an increase or decrease in available filter devices. The determination of whether any given filter device is available may be based on a liveness protocol. The liveness protocol may be used to detect when a filter device has failed (or has been taken out of service) or when a filter device has been added. In response to detecting in a change in the number of available filter devices, the selection function on the perimeter devices may be updated to re-balance the load across the now-available filter device. The following non-limiting example illustrates how the liveness protocol may be used.

Example

Consider a scenario in which there are initially two perimeter devices (A, B) and three filter devices (X, Y, Z). Further, assume that the selection function (which is implemented by all perimeter devices) maps client device 1 to filter device X, client devices 2 and 3 to filter device Y, and client device 4 to filter device Z. At some point in time, by using a liveness protocol, it is determined that filter device Y is no longer available. In this scenario, the selection function implemented on perimeter devices A and B is updated to use the following mapping: client devices 1 and 2 are mapped to filter device X and client devices 3 and 4 are mapped filter device Z. If at a later point in time, filter device W is added, the selection function may again be updated.

End of Example

Continuing with the discussion of FIG. 2, by using a liveness protocol, the perimeter devices can avoid sending NTDUs to the failed (or decommissioned) filter devices. The liveness protocol may be executed using a perimeter device (s) and/or using another computing device (not shown in FIG. 1).

In step 206, the NTDU is transmitted to the filter device via a tunnel. In one embodiment of the invention, transmitting the NTDU via a tunnel includes encapsulating the NTDU to obtain an encapsulated NTDU. The encapsulated NTDU is then transmitted via the data center network to the target filter device (i.e., the filter device identified in step 204). The encapsulation and subsequent transmission of the NTDU to the target filter device may be performed using an encapsulation protocol such as Generic Routing Encapsulation (GRE) or Virtual Extensible Local Area Network (VXLAN). Other encapsulation protocols may be used without departing from the invention.

In another embodiment of the invention, the NTDU in step 206 may be transmitted without encapsulation and/or without using a tunnel when the perimeter device is directly connected to the filtering device. In another embodiment of the invention, instead of encapsulating the NTDU, a virtual local area network (VLAN) tag may be added to the NTDU to generate a modified NTDU. The modified NTDU may then be transmitted to the identified filter device based on the VLAN tag.

Returning to Step 204, when the NTDU is not a client-to-resource NTDU (i.e., the NTDU originated from a resource), then in step 208, the NTDU is mirrored (or otherwise copied) to obtain a mirrored NTDU.

In step 210, the mirrored NTDU is transmitted to the target filter device via a tunnel. The mirrored NTDU may be marked (e.g., in a flag or other indicator) that may be used by the target filter device to identify (or otherwise distinguish) the mirrored NTDU (which is a resource-to-client NTDU) from client-to-resource NTDUs.

The following describes various non-limiting examples of how the filter device may be able distinguish between mirrored NTDU (which is a resource-to-client NTDU) from client-to-resource NTDUs. Specifically, in one embodiment, the marking may be achieved by using a different tunnel destination address for client-to-resource NTDUs than for resource-to-client NTDUs. In another embodiment, the marking may be achieved by using one or more explicit fields in the tunnel header, such as the GRE key. In another embodiment, the marking may be achieved using an implicit mechanism instead of an explicit mechanism. For example, the filter device may be able to distinguish the different types of NTDUs based on the source and/or destination IP addresses in the encapsulated NTDU. In this example, a list of all the resource IP addresses might be explicitly configured into the filter device, e.g., {10.1.2.3, 10.1.5.5, and 10.1.16.17}. Alternatively, a range (or prefix) of IP addresses that covers all possible resource IP addresses might be configured into the filter device, (e.g., 10.1.0.0/16). Other methods may be used without departing from the invention.

Continuing with the discussion of step 210, the target filter device is selected using the same selection function as described in step 204 such that the target filter device corresponds to the same filter device that processes client-to-resource NTDUs associated with the same client device.

In step 210, the mirrored NTDU is transmitted via a tunnel, which may be the same tunnel or a different tunnel than the tunnel used to transmit the NTDU in step 206, to the target filter device. In Step 212, the NTDU is transmitted to the client device.

In one embodiment of the invention, only a portion of the resource-to-client NTDUs are sent to the filter device. In another embodiment of the invention, the perimeter device may rate limit the mirrored NTDUs in an effort to manage the load of mirrored NTDU processing on the filter devices.

FIG. 3 shows a flowchart for processing NTDUs by a filter network device in accordance with one or more embodiments. As discussed above, a filter device may receive that NTDUs originating from client devices and from resources. The flowchart in FIG. 3 addresses processing of NTDUs from both client devices and resources.

In step 300, a NTDU is received from a perimeter device via a tunnel. In embodiments in which the NTDU is encapsulated while it is being transmitted via the tunnel, the filter device may be configured such that it decapsulates any encapsulated NTDUs that it received.

In one embodiment of the invention, the filtering device may not be configured with knowledge of the IP address (or other network addresses) of any perimeter device. In such scenarios, the filtering device may implement "promiscuous GRE decapsulation", in which the filtering device decapsulates and processes any legitimate GRE NTDU that it receives, or any GRE NTDU whose source IP address falls within a range of addresses allocated to the set of possible perimeter devices. This form of configuration may enable perimeter devices to be added and removed without changing the configuration on the filtering devices.

In step 302, a determination is made whether the NTDU is a client-to-resource NTDU. If the NTDU is not a client-to-resource NTDU, then proceed to step 304; otherwise proceed to step 306. The determination in step 302 may be performed in substantially the same manner as the determination in step 202 described above.

In step 304, the NTDU (which is the mirrored NTDU transmitted to the filter device by the perimeter device step 210) is processed to update the flow table. In one embodiment of the invention, the resources only send NTDUs to valid client devices. Accordingly, resource-to-client NTDUs may be used to generate a validated flow in a validated flow table. More specifically, the filter device may generate the validated flow by analyzing the header of the NTDU. Once the validated flow is created, the NTDU may be discarded, because the resource-to-client NTDU is a mirror copy of the original resource-to-client NTDU. Said another way, once processed the NTDU is not forwarded to the client device.

In one embodiment of the invention, each validated flow is associated with age information that indicates whether a resource-to-client NTDU that matches a particular validated flow has been recently processed by the filter device. The age information may be used to manage the size of the validated flow tables. For example, the filter device may periodically delete any validated flow where the aging information indicates that the validated flow has not recently been used to process NTDUs for a period of time.

In one embodiment of the invention, the aging information may be implemented as a set of "age bits" that are set to some fixed value whenever a NTDU that matches the validated flow is received by the filter device. More generally, if a resource-to-client NTDU is received that belongs to a validated flow that is already present in the validated flow table, then that validated flow's aging information is refreshed to prevent it from being deleted by the next aging scan. In this embodiment an aging scan is periodically performed to examine each validated flow and decrement its associated age information. Whenever the age information reaches zero (or some other configured value) then the associated validated flow is deleted. The aging scan may be run continually, at some pre-determined, at a dynamically-determined rate, or only when the validated flow table is full, almost full, has more than a specified number of validated flows, and/or has less than a specified amount of space to store new validated flows.

In another embodiment, the aging information for a validated flow is a timestamp that is set from a periodically-incremented clock, where the timestamp is updated each time a NTDU matching the validated flow is received by the filter device. In this embodiment, an aging scan compares the current time to the validated flow's last-used time and determines if the validated flow should be deleted based on this comparison. The aging scan may be run continually, at some pre-determined, at a dynamically-determined rate, or only when the validated flow table is full, almost full, has more than a specified number of validated flows, and/or has less than a specified amount of space to store new validated flows.

In one embodiment of the invention, the validated flow table may include flow table entries, where each of the flow table entries includes a validated flow. In another embodiment of the invention, the filter device uses a bloom filter instead of a validated flow table. The bloom filter is a probabilistic data structure. In embodiments in which a bloom filter is used, the resource-to-client NTDUs are used to populate the bloom filter; said another way, the resource-to-client NTDUs are used to generated validated flows which are then added to the set of validated flows covered by the bloom filter.

In one embodiment of the invention, the generating of the validated flows and the subsequent population of the validated flow table or the bloom filter may be performed in hardware (e.g., in the data plane of the filter device) instead of in software (e.g., in the control plane of the filter device).

Continuing with the discussion of FIG. 3, when the NTDU is a client-to-resource NTDU, then in step 306, a determination is made about whether the NTDU is associated with (or otherwise matches) a validated flow. If the NTDU is not associated with a validated flow, proceed to step 310.

In one embodiment of the invention, the flow for a NTDU may be defined by the pair of the source (i.e., client device) and destination (i.e., resource) IP addresses. The flow may be defined using different and/or additional information without departing from the invention. The flow for the NTDU (i.e., the information in the header of the NTDU) is used to perform a look-up in the validated flow table in the filter device in order to determine whether there is a matching validated flow.

In another embodiment of the invention, a nonce may be used to generate the validated flow. In this embodiment, a nonce is randomly chosen (or chosen in some other way) and assigned to each client device-resource pair. The selection and assignment of the nonce may be performed by a program executing on the resource. In another embodiment, the nonce is selected by the client device. The nonce may then be included in every NTDU transmitted between a client device and resource. For example, the nonce may be a 32 or 64-bit value that is stored in the application-layer header of a NTDU.

In scenarios in which a nonce is used, the filter device may include the nonce in the validated flows. As such, the filter device may use the nonce in combination with other information in the header of the NTDU to determine whether an NTDU is associated with a validated flow.

In another embodiment of the invention, as discussed above, the filter device may implement a bloom filter. In these scenarios, the flow associated with the NTDU is processed using the bloom filter to determine whether it is associated with a validate flow.

In step 308, upon making a determination that the NTDU is associated with a validated flow, the NTDU is transmitted to the resource. In one embodiment of the invention, the transmission of the NTDU in step 308 is rate limited in order to manage the load of NTDU processing on the resources. The rating limiting may vary across the validated flows and/or vary across the filtering devices.

Returning to Step 306, when the NTDU is not associated with a validated flow, then in step 310, a determination is made about whether the NTDU is blacklisted. A NTDU is blacklisted if it is determined that the NTDU originated from a client device that is known to be malicious. If the NTDU is blacklisted, proceed to step 314; otherwise, proceed to step 312. In one embodiment of the invention, the blacklist is periodically updated on the filter devices.

In one embodiment of the invention, if a nonce is included in the NTDU, then packets with an invalid nonce are dropped in step 306, because the nonce is included in the validated flow.

In another embodiment of the invention, if a nonce is included in the NTDU (discussed above), then the nonce may be used to identify malicious client devices and trigger rapid updating of the blacklist accordingly. More specifically, in scenarios in which an attacker is able to learn both a valid IP address of a client device and the nonce associated with that client device, the attacker may then generate invalid NTDUs that have a "spoofed" IP address that corresponds to the address of valid client device, and also carry the correct nonce for the client device-resource pair. By sampling the NTDUs, a determination may be made that there are a large number (e.g., above a threshold) of NTDUs being transmitted between a client device-resource pair, which would then alert the filter device that the client device (which can be identified by the nonce) has been compromised. Once this determination is made, the blacklist may be updated to drop NTDUs that have a nonce associated with the client device that has been compromised. The use of the nonce is advantageous because it allows the filter device to blacklist only the compromised client device. Other methods of updating the blacklist may be used without departing from the invention.

In step 312, upon a determination that that the NTDU is blacklisted, the NTDU is dropped.

In step 314, upon a determination that the NTDU is not blacklisted, the NTDU is transmitted, using a rate limiter, to the resource. More specifically, in one embodiment of the invention, if a validated flow is not found for the NTDU then the NTDU may be deemed to be unknown. Because the NTDU is unknown its transmission is controlled by one or more rate limiters that bound the rate at which unknown NTDUs are sent to the resource in some time interval. The rate limiter(s) may be configured to transmit NTDU at a rate that is substantially less than the transmission rate of NTDUs that would be required to congest the resource's network capacity or NTDU processing capacity. If this rate limiting process does not cause the NTDU to be dropped, then the NTDU is forwarded to the resource. In one embodiment, an NTDU that exceeds the allowed rate may be delayed (to reduce the rate) and may be dropped in scenarios in which the buffer capacity of the filter device has been reached and, as such, the filter device cannot buffer the NTDU.

The rate limiting may be performed so as to limit the NTDUs per second delivered to the resource, the bytes per second delivered to the resource, or both. The specific rate that is used by the rate limiters may depend on the network and processing capacity of the resource.

The following describes two non-limiting examples of embodiments of the invention. The examples are not intended to limit the invention.

EXAMPLES

Figure 4A:
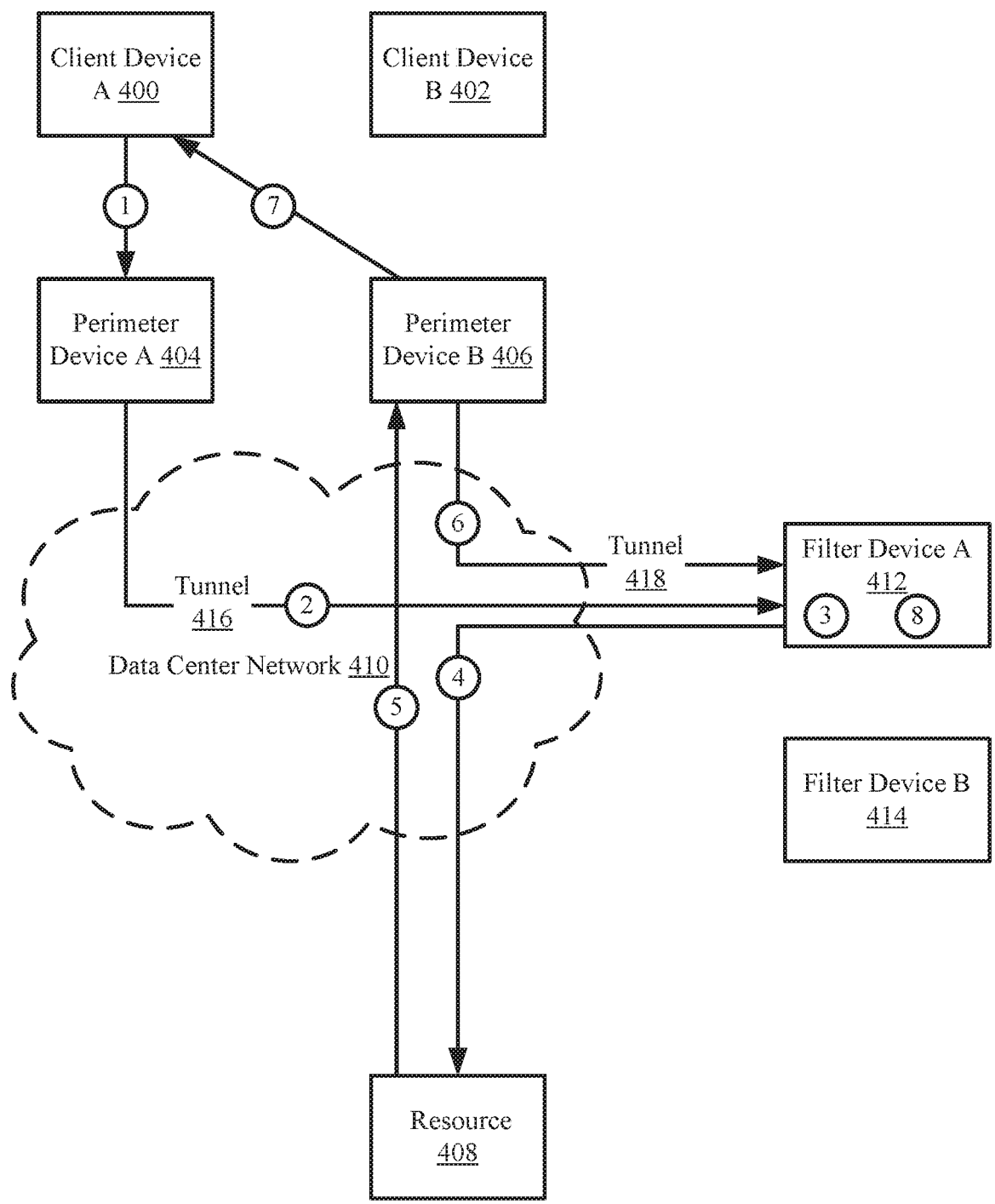
FIGS. 4A and 4B show an example in accordance with one or more embodiments.
Figure 4B:
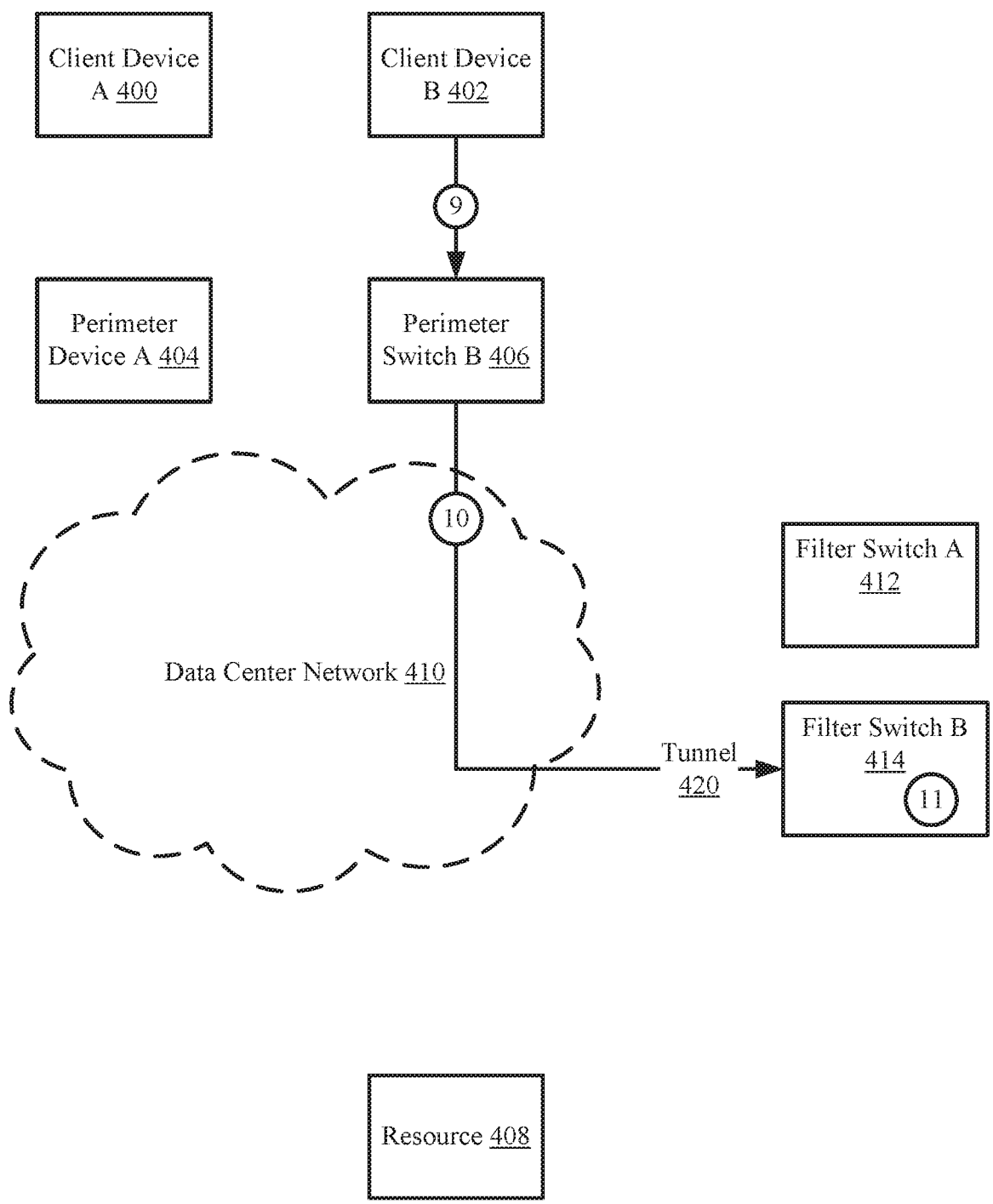

FIGS. 4A and 4B show two examples in accordance with one or more embodiments. The examples are not intended to limit the scope of the invention.

Consider a scenario in which in which a system includes perimeter device A (404), perimeter device B (406), filter device A (412), filter device B (414), and a resource (408), all of which are connected via a data center network.

Scenario 1

Referred to FIG. 4A, (1) client device A (400) transmits a NTDU destined for the resource (408), where the NTDU reaches perimeter device A (404). At (2), in accordance with FIG. 2, Perimeter Device A (404) determines, after applying a selection function to the NTDU, that it should transmit the NTDU to filter device A (412) and subsequently transmits the NTDU, via a tunnel (416), to filter device A (412). At (3), Filter device A (412) makes a determination that the NTDU is associated with a validated flow. Accordingly, at (4), filter device A (412) transmits the NTDU to a resource (408).

At (5), in response, the resource (408) processes the NTDU, generates a resource-to-client NTDU, and transmits the resource-to-client NTDU towards client device A (400). The resource-to-client NTDU is directed, based on the configuration of the data center network, to perimeter device B (406). At (6), perimeter device B (406) mirrors the resource-to-client NTDU, and makes a determination, using a selection function (which is same selection function implemented by perimeter device A (406)), to transmit the mirrored resource-to-client NTDU to filter device A (412) via tunnel (418). At (7), thereafter, perimeter device B (406) transmits the resource-to-client NTDU to client device A (400). At (8), filter device A (412) processes the mirrored resource-to-client NTDU to update the validated flow table with a validated flow from client device A to the resource.

Scenario 2

At (9) perimeter device B (406) receives a NTDU from client device B (402), wherein the NTDU is destined for the resource. At (10), a determination is made, using the selection function, that perimeter device B (406) should transmit the NTDU to filter device B (414). Based on this determination, perimeter device B transmits the NTDU, via a tunnel (420), to filter device B. At (11), filter device B (414) processes the NTDU and determines that the NTDU should be dropped (i.e., the NTDU is on a blacklist).

End of Example

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing network traffic data units (NTDUs), the method comprising:
   receiving, by a first network device, a first NTDU from a second network device, wherein the first NTDU originated from a client device;
   making a first determination that the first NTDU is a client-to-resource NTDU;
   based on the first determination, making a second determination that the first NTDU is associated with a validated flow;
   based on the second determination, transmitting the first NTDU to a resource;
   receiving a second NTDU from the second network device;
   making a third determination that the second NTDU is a resource-to-client NTDU, wherein the second NTDU is associated with the resource; and
   based on the third determination, updating the validated flow using the second NTDU to obtain an updated validated flow.

2. The method of claim 1, wherein the second NTDU is not forwarded to the client device.

3. The method of claim 1, wherein the second NTDU is generated by the second network device using at least a portion of a third NTDU that originated from the resource.

4. The method of claim 1, further comprising:
   receiving, by the first network device, a third NTDU from a third network device, wherein the third NTDU originated from the resource and is destined for the client device;
   making a fourth determination that the third NTDU is a second resource-to-client NTDU, and
   based on the fourth determination, updating the updated validated flow using the third NTDU.

5. The method of claim 1, wherein the second NTDU is received via a tunnel.

6. The method of claim 5, wherein the first NTDU is received via a second tunnel.

7. The method of claim 1, wherein the first NTDU and the second NTDU are received via a tunnel.

8. The method of claim 1, wherein updating the validated flow using the second NTDU comprises updating aging information associated with the validated flow.

9. The method of claim 1, wherein the first NTDU comprises a nonce and the second NTDU comprises the nonce, wherein the nonce is generated by the client device or the resource, and wherein the nonce is specific to a client device-resource pair.

10. The method of claim 1, further comprising:
    receiving, by the first network device, a third NTDU from the second network device, wherein the third NTDU originated from a second client device;
    making a fourth determination that the third NTDU is a second client-to-resource NTDU;
    based on the fourth determination, making a fifth determination that the third NTDU is not associated with any validated flow; and
    processing the third NTDU based on the fifth determination.

11. The method of claim 10, wherein processing the third NTDU comprises:
    transmitting, using a rate limit, the third NTDU to the resource.

12. The method of claim 10, wherein processing the third NTDU comprises dropping the third NTDU.

13. The method of claim 1, wherein the first NTDU is received via a tunnel.

14. The method of claim 13, wherein the tunnel is a Generic Routing Encapsulation (GRE) tunnel.

15. The method of claim 13, wherein the tunnel is configured to receive encapsulated NTDUs from network devices associated with IP addresses in a specified range, wherein the second network device is associated with an IP address in the specified range, wherein an encapsulated NTDU is received by the first network device via the tunnel, and wherein the encapsulated NTDU is decapsulated by the first network device to obtain the first NTDU.

16. The method of claim 1, wherein the second network device is interposed between the client device and the first network device.

17. The method of claim 16, wherein all NTDUs originating from the client device are processed by the first network device.

18. The method of claim 1, wherein the first network device comprises a bloom filter, wherein the bloom filter comprises the validated flow, wherein the validated flow is generated in a data plane of the first network device.

19. A non-transitory computer readable medium comprising instructions that, when executed by a processor, perform a method comprising:
    receiving, by a first network device, a first network traffic data unit (NTDU) from a second network device;
    making a first determination that the first NTDU is a client-to-resource NTDU;
    based on the first determination, making a second determination that first NTDU is associated with a validated flow;
    based on the second determination, transmitting the first NTDU to a resource;
    receiving a second NTDU from the second network device;
    making a third determination that the second NTDU is a resource-to-client NTDU, wherein the second NTDU is associated with the resource; and
    based on the third determination, updating the validated flow using the second NTDU to obtain an updated validated flow.

20. The non-transitory computer readable medium of claim 19, wherein the first NTDU and the second NTDU are received via a tunnel.

21. A network device comprising instructions that, when executed by a processor, perform a method comprising:
    receiving, by the network device, a network traffic data unit (NTDU) from a second network device;
    make a first determination that the NTDU is a client-to-resource NTDU;
    based on the first determination, make a second determination that NTDU is associated with a validated flow;
    based on the second determination, transmitting the NTDU to a resource;
    receiving a second NTDU from the second network device;
    making a third determination that the second NTDU is a resource-to-client NTDU, wherein the second NTDU is associated with the resource; and
    based on the third determination, updating the validated flow using the second NTDU to obtain an updated validated flow.

22. The network device of claim 21, wherein updating the validated flow using the second NTDU comprises updating aging information associated with the validated flow.

\* \* \* \* \*